United States Patent [19]
Waggott

[11] Patent Number: 6,145,844
[45] Date of Patent: Nov. 14, 2000

[54] SELF-ALIGNING SEALING ASSEMBLY FOR A ROTATING SHAFT

[75] Inventor: John Waggott, Wellsville, N.Y.

[73] Assignee: Dresser-Rand Company, Corning, N.Y.

[21] Appl. No.: 09/078,092

[22] Filed: May 13, 1998

[51] Int. Cl.[7] .................................................. F16J 15/447
[52] U.S. Cl. ........................... 277/412; 277/421; 277/422
[58] Field of Search ..................................... 277/411, 412,
277/413, 416, 421, 422, 580, 581; 415/174.5

[56] References Cited

U.S. PATENT DOCUMENTS

| | | |
|---|---|---|
| 2,210,543 | 8/1940 | Cox . |
| 3,518,020 | 6/1970 | Lake . |
| 3,529,904 | 9/1970 | Scalzo et al. . |
| 3,594,010 | 7/1971 | Warth . |
| 3,599,990 | 8/1971 | Greiner et al. . |
| 3,806,136 | 4/1974 | Warner et al. . |
| 3,829,233 | 8/1974 | Scalzo et al. . |
| 3,975,114 | 8/1976 | Kalkbrenner . |
| 3,979,128 | 9/1976 | Geary . |
| 3,991,588 | 11/1976 | Laskaris . |
| 4,012,049 | 3/1977 | Lambrecht et al. . |
| 4,180,343 | 12/1979 | Finlay . |
| 4,336,944 | 6/1982 | Blair . |
| 4,411,437 | 10/1983 | Conti . |
| 4,605,234 | 8/1986 | Metcalf . |
| 4,613,141 | 9/1986 | Heinen . |
| 4,754,983 | 7/1988 | Kruger . |
| 4,943,069 | 7/1990 | Jinnouchi . |
| 4,998,739 | 3/1991 | Weiler . |
| 5,224,714 | 7/1993 | Kimura et al. . |
| 5,251,914 | 10/1993 | Tatum . |
| 5,344,160 | 9/1994 | Scarlata et al. . |
| 5,354,070 | 10/1994 | Carmody . |
| 5,395,124 | 3/1995 | Brandon . |
| 5,403,019 | 4/1995 | Marshall . |
| 5,464,226 | 11/1995 | Dalton . |
| 5,603,510 | 2/1997 | Sanders . |

*Primary Examiner*—Anthony Knight
*Assistant Examiner*—John L. Beres
*Attorney, Agent, or Firm*—Haynes and Boone, LLP

[57] ABSTRACT

A self-aligning, sealing assembly in accordance with the present invention includes a sealing apparatus and at least one preloading device. The sealing assembly is mounted in machinery which has a rotating shaft and a stationary member with an inner surface which is spaced from and surrounds a shaft. A slot is located in and extends around the inner surface of the stationary member. The slot has an upstream surface, a downstream surface, and an outer surface. The sealing apparatus is adjustably disposed in the slot and has an inner surface, an outer surface, an upstream surface and a downstream surface. Labyrinth seal teeth extend radially inward from the inner surface of the sealing apparatus. Each tooth is radially spaced from the shaft to form a non-contact seal. A space between the outer surface of the ring and the inner surface of the slot is designed to accommodate radial movement of the ring resulting from radial movement of the shaft. The preloading device has first and second ends, with the first end abutting the upstream surface of the slot and the second end abutting an opposing surface of the sealing apparatus. The preloading device ensures sufficient frictional forces between the ring and the slot to support the weight of the sealing apparatus when an insufficient pressure difference exists.

24 Claims, 4 Drawing Sheets

SELF-ALIGNING SEALING ASSEMBLY FOR A ROTATING SHAFT

FIELD OF THE INVENTION

This invention relates generally to a seal and more particularly to a self-aligning, sealing assembly for a rotating shaft in a turbine.

BACKGROUND OF THE INVENTION

In applications, such as in a steam turbine, it is important to minimize the leakage between high and low pressure areas. One of the most problematic areas in minimizing leakage is between the rotating shaft and stationary structures such as diaphragms. Inherently, a gap or clearance exists between the rotating shaft and the stationary diaphragm where steam can leak through.

Ideally, these gaps or clearances are kept at a minimum, but the changing alignment of the rotating shaft with respect to the stationary diaphragm will limit how tight these gaps or clearances can be made. Additionally, fouling due to deposit build up from the motive fluid in the apparatus, can impede the operation of mechanisms designed to relieve interference caused by such changing alignment.

One technique to minimize the gap or clearance between the rotating shaft and the stationary diaphragm is the use of a floating labyrinth ring seal sized to fit within a cavity in the diaphragm, such as that disclosed in U.S. Pat. No. 5,403,019 to Marshall which is herein incorporated by reference. Although this seal provides a reasonably close gap or clearance, the seal would not work well when there is an abnormally small pressure difference across the seal. During a low pressure differential the stationary seal rests on the rotating shaft, prematurely wearing the stationary seal or the rotating shaft.

SUMMARY OF THE INVENTION

A self-aligning, sealing assembly in accordance with the present invention includes a sealing apparatus and at least one preloading device. The sealing assembly is mounted in machinery which has a rotating shaft and a stationary member with an inner surface which is spaced from and surrounds a shaft. A slot is located in and extends around the inner surface of the stationary member. The slot has an upstream surface, a downstream surface, and an outer surface. The sealing apparatus is adjustably disposed in the slot and has an inner surface, an outer surface, an upstream surface and a downstream surface. Labyrinth seal teeth extend radially inward from the inner surface of the sealing apparatus. Each tooth is radially spaced from the shaft to form a non-contact seal. A space between the outer surface of the ring and the inner surface of the slot is designed to accommodate radial movement of the ring resulting from radial movement of the shaft. The preloading device has first and second ends, with the first end abutting the upstream surface of the slot and the second end abutting an opposing surface of the sealing apparatus. The preloading device ensures sufficient frictional forces between the ring and the slot to support the weight of the sealing apparatus when an insufficient pressure difference exists.

The sealing assembly in accordance with the present invention provides a number of advantages including maintaining a close running clearance between a rotating shaft and a self-aligning, sealing apparatus or member under adverse circumstances, such as changing alignment between stationary and rotating members, buildup of hard coating deposits released from the working fluid, and sustained periods of abnormally small pressure differential across the seal. Additionally, the sealing assembly includes unique features, such as a pair of broad bearing surfaces which are designed to protect the integrity of the labyrinth seal teeth and a protrusion on the downstream surface of the sealing apparatus or downstream surface of the slot so that frictional forces resulting from axial pressure forces can be overcome to permit realignment of the sealing assembly.

DETAILED DESCRIPTION

Figure 1:
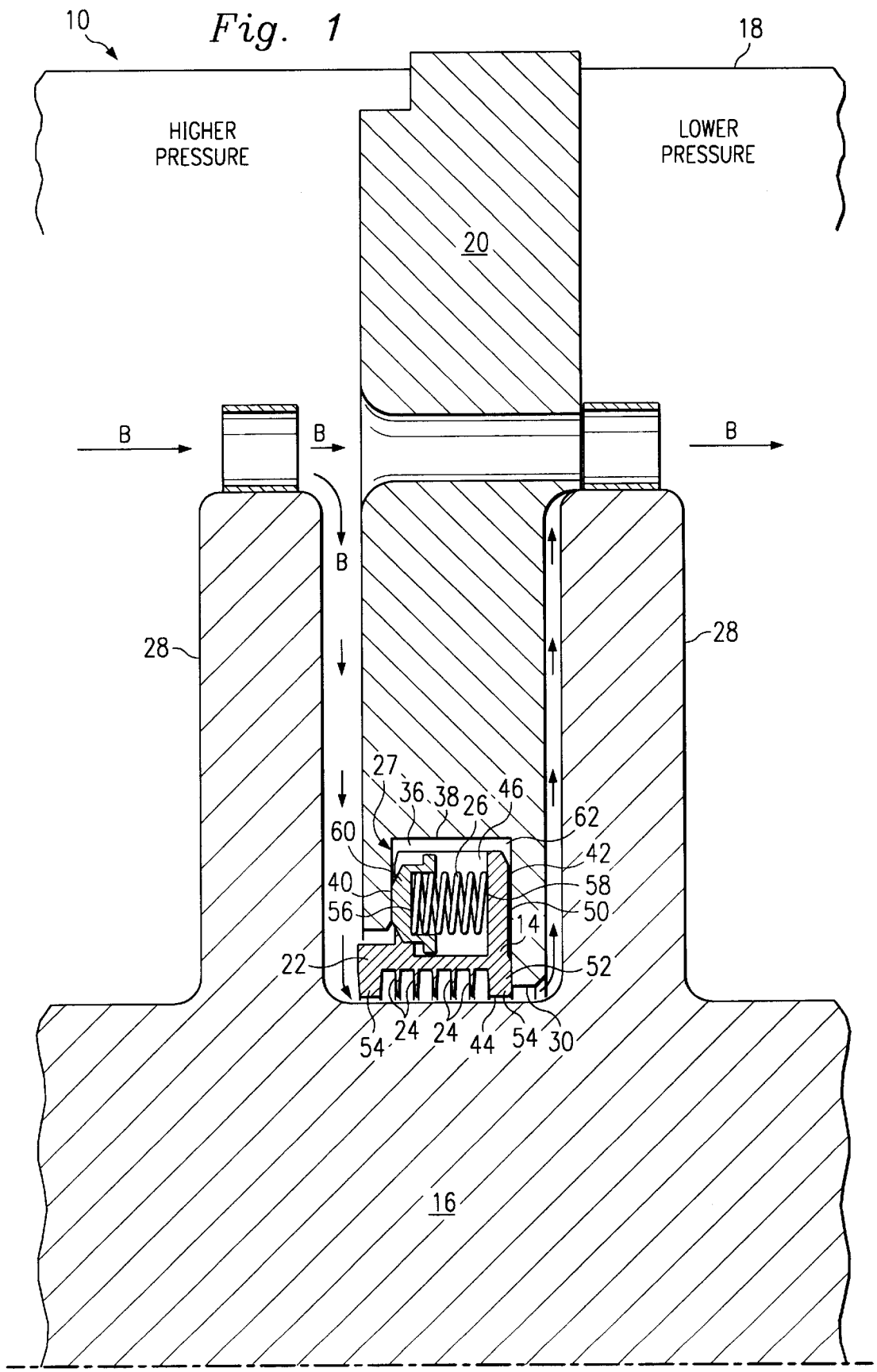
FIG. 1 is a cross-sectional view of a self-aligning sealing assembly in accordance with the present invention mounted in a portion of a diaphragm in a turbine.

A sealing assembly 22 in accordance with one embodiment of the present invention in machinery 10 is illustrated in FIG. 1. The sealing assembly 22 includes a sealing apparatus 14 with a plurality of labyrinth seal teeth 24 and abrasion resistant bearing surfaces 54 and a plurality of preloading devices 27. The machinery 10 includes a shaft 16, a housing 18, and diaphragm or stationary pressure boundary 20 with a slot 36. The self-aligning sealing assembly 22 in accordance with the present invention is intended for use in machinery where a rotating shaft penetrates the stationary pressure boundary 20 to control leakage by maintaining small radial clearances between the stationary and rotating components. One of the features of the sealing assembly 22 is its ability to move radially with the rotating shaft 16 when the alignment between stationary and rotating structures in the machinery 10 changes. Another feature of the sealing assembly 22 is the minimization of the amount of force needed to reposition the sealing assembly 22 when sealing against large pressure differences. Yet another feature of the invention is the ability of the sealing assembly 22 to support its own weight without resting on the rotating shaft 16 when the pressure difference is small. Yet another feature of the sealing assembly 22 is its ability to be installed in locations where access for installations is limited.

Referring more specifically to FIG. 1, machinery 10 includes shaft 16 which extends along and rotates about axis A—A. Rotor wheels 28 are mounted on or are integrally formed with the shaft 16 and extend radially outward from the shaft 16 to a radially outermost periphery. The direction of flow of motive fluid, such as steam, in machinery 10 is illustrated by the arrows B in FIG. 1.

The machinery 10 also includes the housing 18 and diaphragm 20. The housing 18 extends around the shaft 16 and the rotor wheels 28 and defines an interior which retains the working or motive fluid in the machinery 10. The diaphragm 20 is mounted to or is integrally formed with the housing 18 and extends radially inward from the housing 18 towards the shaft 16 to an inner surface 30. The diaphragm 20 may be split into halves 20(1) and 20(2) at the diaphragm split line 32 to enable assembly of the diaphragm 20 between rotor wheels 28. In this particular embodiment, the halves of the diaphragm 20 are aligned and held in place by the housing 18, although other techniques for securing and aligning the halves of diaphragm 20 together could be used, such as through the use of bolts.

Referring to FIGS. 1–3, and 5, the slot 36 is formed in the inner surface 30 of the diaphragm 20 and includes an outer surface 38, an upstream surface 40, and a downstream surface 42. The slot 36 is designed to receive the sealing assembly 22 and must be able to accommodate all anticipated radial movement of the sealing assembly 22. The distance between the surfaces 40 and 42 must be coordinated with the design of the sealing assembly 22 to ensure that the preloading devices 27 can carry the required load, i.e. at a minimum enough to support the weight of the sealing assembly 22 through friction. Other than that, the slot 36 has no other specific size and shape requirements.

In this particular embodiment, the slot 36 has a substantially circular or ring in shape, although slot 36 could have other shapes, such as a hexagonal shape, and the upstream surface 40 and downstream surface 42 are substantially flat and parallel to each other. The diameter of the slot 36 measured from the outer surface 38 on one side of the slot 36 to the outer surface 38 on the diametrically opposite side of the slot 36 is larger than the diameter of the sealing assembly 22 which is also circular in this example, although the sealing assembly 22 can have other shapes as needed or desired, and is measured from an outer surface 46 on one side of the sealing assembly 22 to the outer surface 46 on the diametrically opposite side of the sealing assembly 22. As a result, there is an annular space 62 between the outer surface 38 of the slot 36 and the outer surface 46 of the sealing assembly 22 leaving gaps $d_1$ and $d_2$. The annular space 62, permits the sealing assembly 22 to move radially in slot 36 to adjust for changes in the location of the shaft 16.

The sealing assembly 22 includes an inner surface 44, the outer surface 46, an upstream surface 48, and a downstream surface 50 and extends around the circumference of the shaft 16. The inner surface 44 of sealing assembly 22 is positioned as close as is practical to the rotating shaft 16 to provide the primary, non-contact obstruction of leakage flow that is the intent of any sealing device, although some contact sealing is possible and may be desired. The effectiveness of this flow obstruction is greatly enhanced by forming this inner surface 44 into or adding a plurality of labyrinth teeth 24 which extend radially inward toward shaft 16. The length, spacing and thickness of these labyrinth teeth 24 is the same as would be used on any conventional labyrinth, non-contact seal and these proportions are well known to anyone of ordinary skill in the art.

The broad bearing surfaces 54 are provided at the upstream and downstream limits of the inner surface 44 of the sealing ring 14 to protect the labyrinth teeth 24 from undue abrasion when sealing assembly 22 is pushed by shaft 16 to maintain alignment. Like labyrinth teeth 24, broad bearing surfaces 54 extend radially inward towards shaft 16. The bearing surfaces 54 are fashioned to have the same running clearances from the shaft 16 as the labyrinth teeth 24. As mentioned previously, this running clearance should be as close as is practical. With conventional non-contact seals this practical clearance would typically reflect the sum of both dynamic and sustained alignment changes that might be expected during operation. With this current invention only the dynamic changes need to be accommodated, which gives an opportunity for reduced running clearances and hence reduced leakage. The number, width and location of the broad bearing surfaces 54 depends on the abrasive attributes of the materials used to make shaft 16 and sealing assembly 22. When the working fluid does not offer lubricating properties it is important that the sealing assembly 22 is made of a material which offers dry self lubricating interaction with the material used to make shaft 16. This is a common requirement for conventional labyrinth seals and is well understood by anyone of ordinary skill in the art. In this particular embodiment, the broad bearing surfaces 54 each have an axial width which is at least twice as large as the axial width of any of the labyrinth teeth 24.

To maximize the effectiveness of the sealing assembly 22, the inner surface 44 should be made as long as possible in the axial space available. In many practical applications, such as the particular embodiment illustrated in FIGS. 1, 3 and 5, the axial space available for a sealing assembly 22 is limited leading to some application specific design details. Similarly, the thickness of diaphragm 20 is limited to fit in the same axial space, requiring the slot 36 which houses the sealing assembly 22 to be somewhat smaller in axial length than the inner surface 44 of the sealing assembly 22. These practical requirements make the outer surface 46 of sealing assembly 22 shorter than its inner surface 44 and give the sealing assembly 22 its generally L-shaped cross-section. If axial space was not limited by the particular application, this shape would not be necessary.

During operation, a pressure difference across the upstream and downstream surfaces 40 and 42 of the diaphragm 20 exerts a downstream force on the sealing assembly 22. When this force is resisted by the downstream surface 42 of slot 36 in diaphragm 20 a frictional force is available between the downstream surface 50 of the sealing assembly 22 and the downstream surface 42 of slot 36. This frictional force resists radial motion of the sealing assembly 22 when shaft 16 attempts to reposition it. If this pressure difference is large, then the frictional resistance and the consequential abrasion of labyrinth teeth 24 and broad bearing surfaces 54 contacting shaft 16 may also be large.

In this invention, this downstream frictional force on the sealing assembly 22 is reduced by reducing the area that the pressure difference acts on. This is accomplished by placing the contact region between the sealing ring 14 and the downstream surface 42 of slot 36 as close as possible to the surface of shaft 16. In the particular embodiment shown in the FIGS. 1 and 3, this is achieved by forming protrusion 52 on the downstream face 50 of sealing ring 14 and adjacent to the inner surface 44 of the sealing ring 14. The inner edge of the downstream surface 42 must also be positioned as close as practical to the surface of shaft 16 so that it will satisfactorily contact protrusion 52 on sealing ring 14. Alternatively, protrusion 52 could extend out from downstream surface 42 of slot 36.

In normal operation, the downstream force caused by the pressure difference across sealing assembly 22 will allow friction forces between protrusion 52 and the downstream surface 42 of slot 36 that far exceed the weight of sealing assembly 22, thus ensuring that the weight of the sealing assembly 22 will not be supported by the rotating shaft 16. However, it is common for some machines to have extended periods of operation without significant pressure differences, and the available friction forces will not be sufficient to support the weight of the prior seals.

Figure 3:
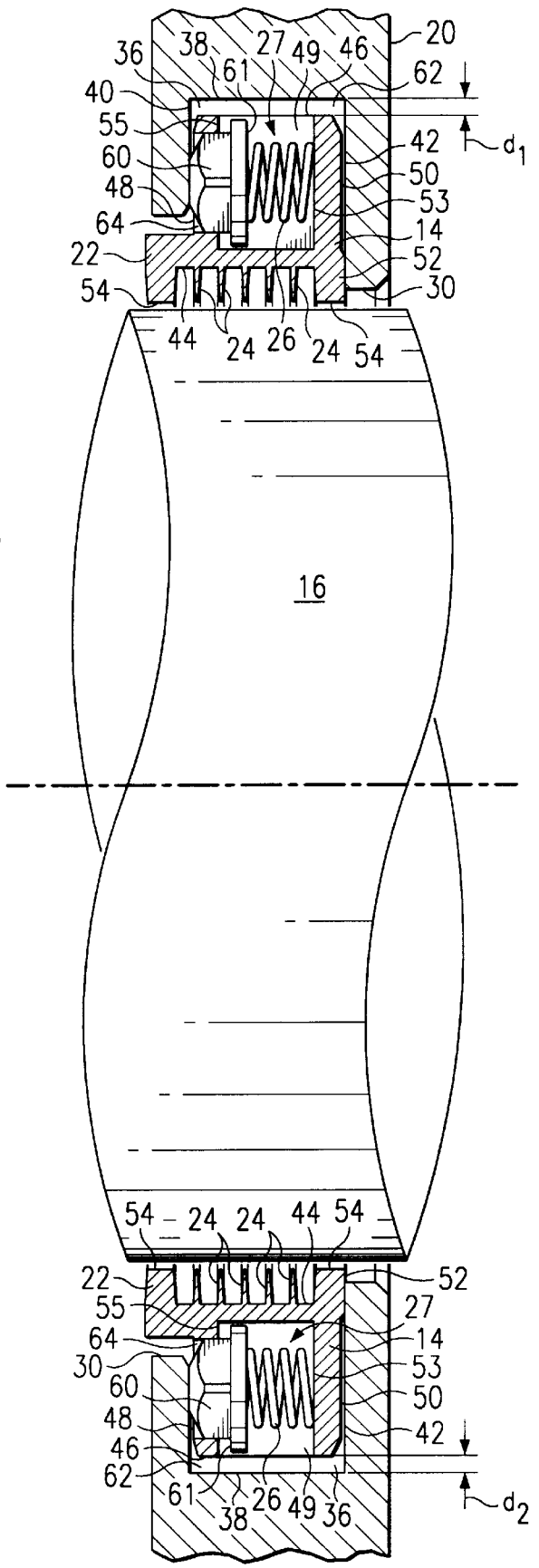
FIG. 3 is a cross-sectional view of the diaphragm, the self-aligning, sealing assembly, the shaft.
Figure 5:
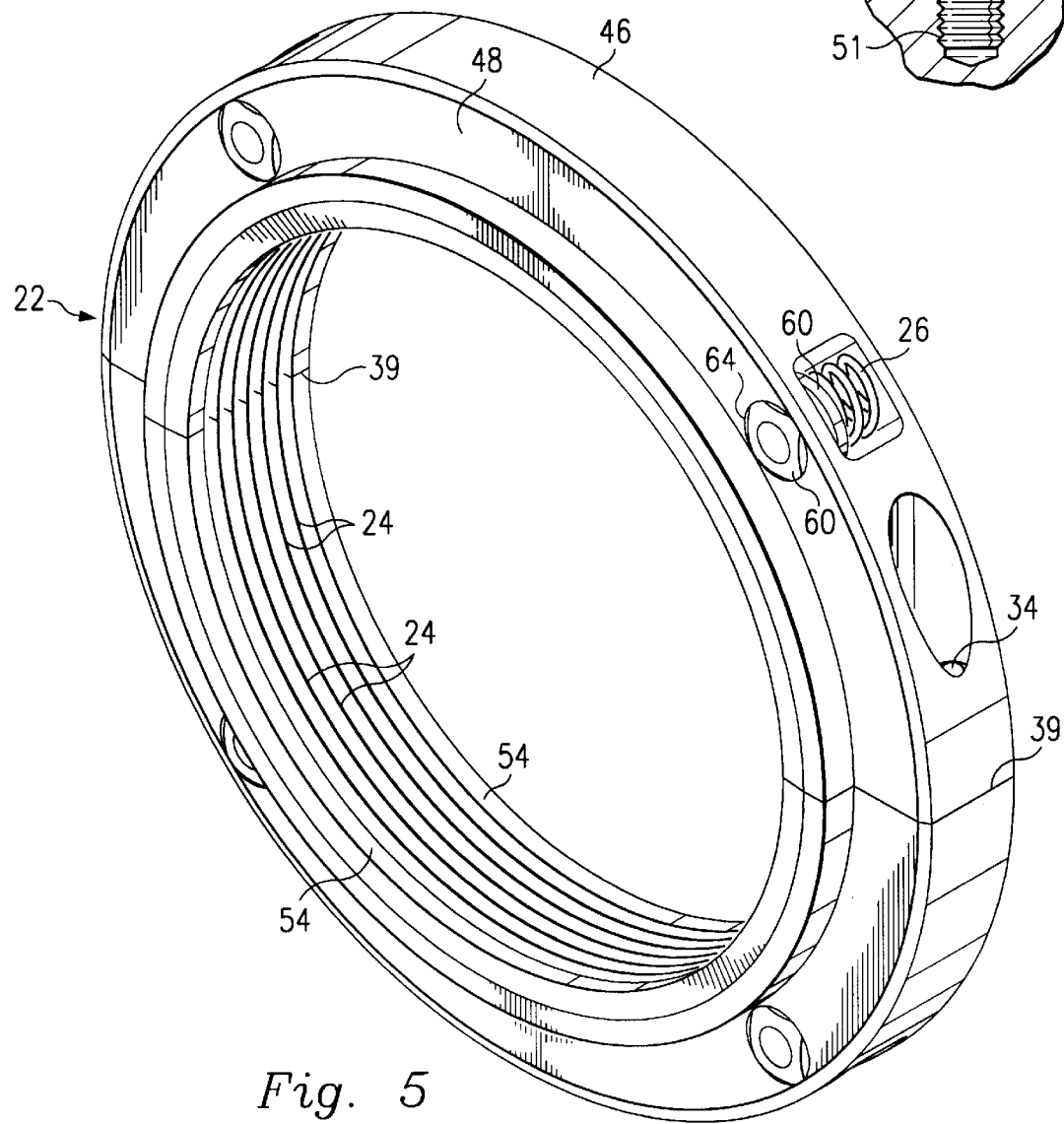
FIG. 5 is an isometric view of the self-aligning sealing assembly.

To accommodate these circumstances, the present invention utilizes unique preloading devices 27 which are installed in pockets or openings 49 in the outer surface 46 of sealing assembly 22, as shown in FIGS. 3 and 5. In this particular embodiment, each preloading device 27 comprises a spring 26 and a retaining cap 60, although other types of preloading devices could be used as needed or desired. The pockets 49 within the outer surfaces 46 have substantially flat and parallel upstream and downstream inner surfaces 55 and 53 large enough to accommodate the retaining cap 60 and the end of the spring 26 respectively. These preloading devices 27 exert axial forces between the sealing assembly 22 and the upstream and downstream surfaces 40 and 42 of slot 36 that provides friction forces sufficiently large to support the weight of sealing assembly 22 in slot 36 even when there is no significant pressure difference.

A hole 64 in the upstream surface 48 of the sealing assembly 22 into each pocket 49 is required to accommodate the protruding retaining cap 60. This hole must have a close, but freely sliding fit on the retaining cap 60. The portion of the retaining cap 60 that fits through the hole in the upstream surface 48 of the sealing assembly 22 is relieved to create narrow axial lines of contact with the surface of the hole, with the intent of reducing susceptibility to fouling with solid deposits from the working fluid. The holes 64 ensure that the retaining caps 60 ride with the sealing assembly 22, so that friction forces between cap 60 and upstream surface 40 of slot 36 can contribute to supporting the weight of the sealing assembly 22. This design for assembling the preloading devices 27 also stops spring 36 from being distorted during assembly. The retaining cap 60 has a flange 61 to limit its outward travel through hole 64 and so holds spring 26 in a compressed position before assembly into slot 36, it also has a large shallow angled chamfer on the protruding end to facilitate further compression of spring 26 when inserted in slot 36.

The number of preloading devices 27 and the design of the springs 26 must meet two important criteria:

(1) The combined force of all of the installed springs 26 must be enough to support the weight of the sealing assembly 22 through friction; and (2) The combined spring 26 and retaining cap 60 must be able to be compressed for assembly in pocket 49 without damaging the spring 26.

In this particular embodiment, each spring 26 exerts a force of about 1.25 the weight of the sealing assembly 22, so with four springs 26 and friction on both upstream and downstream surfaces 40 and 42 of slot 36 the preloading devices 27 will support the weight of the sealing assembly 22 with a coefficient of friction of 0.1, i.e. weight×1.25×4(springs)×2(ends)×0.1(coef. fric.)=weight×1.00.

Figure 2:
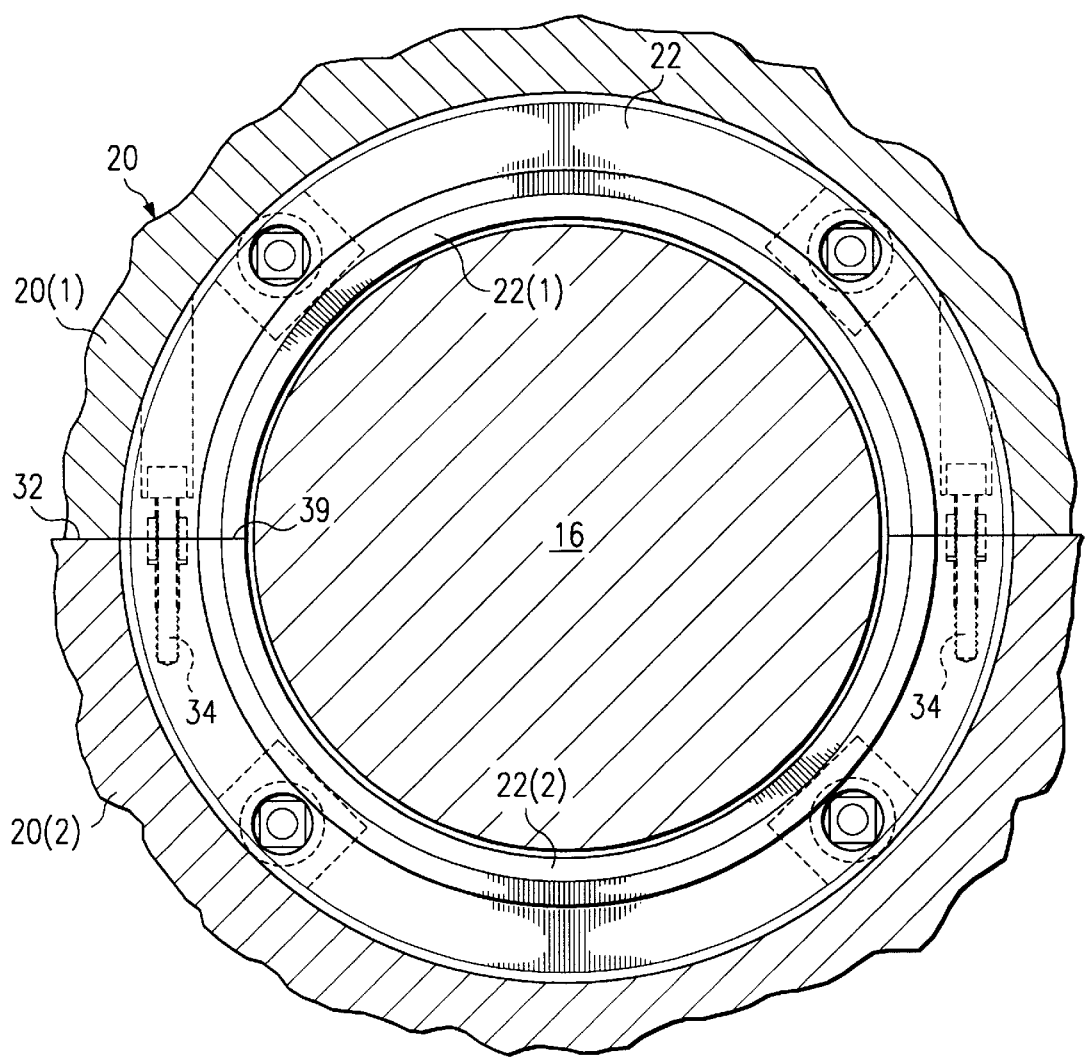
FIG. 2 is an axial view of the self-aligning sealing assembly and the shaft.

Since access to the desired location on shaft 16 for installation of sealing assembly 22 is not always feasible, as illustrated in the example shown in FIG. 1, the sealing assembly 22 may be divided into two equal halves 22(1) and 22(2) at split line 39 so that it can be assembled to closely fit around shaft 16 as shown in FIG. 2.

Figure 4:
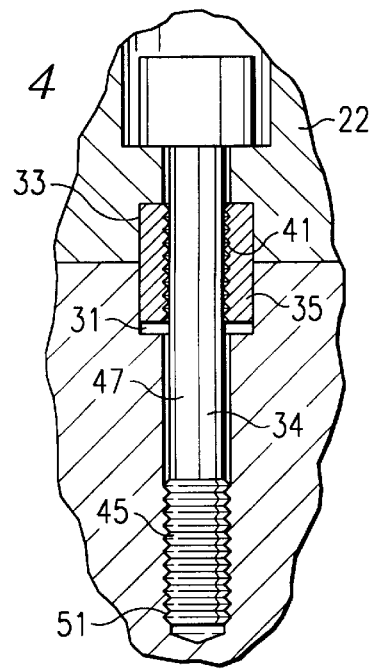
FIG. 4 is an enlarged view of a captive fastener and alignment device illustrated in FIG 2.

Since the sealing assembly 22 must function as a one piece, non-contact seal and be able to follow the shaft 16 when alignment between the shaft 16 and the diaphragm 20 varies, the halves of the sealing assembly 22 must be correctly aligned and fastened together at their adjoining ends. In this particular embodiment, this is achieved with a pilot bushing 35 and a screw 34 adjacent the ends of each half as illustrated in FIGS. 2 and 4.

The bushing 35 is tightly fitted into a shallow hole 33 in one of the adjoining ends of half of the sealing assembly 22(1) adjacent the split line 39. The shallow hole 33 has a depth equal to approximately half the length of bushing 35. The protruding end of bushing 35 has a chamfered or tapered end to facilitate assembly into a second shallow hole 31 in the adjoining end of the other half of sealing assembly 22(2).

This second shallow hole 31 is sized to be close fitting, but freely sliding about the protruding end of bushing 35. This same bushing 35 has an internal thread 41. The bushing 35 is used to align the halves of sealing assembly 22 and to loosely capture screw 34.

Each screw 34 has an external screw thread 45 at one end that matches screw thread 41 in bushing 35. Between the head of screw 34 and the threaded portion 45 of special screw 34 there is an unthreaded portion 47 with a length equal to 2.5 to 3 times the length of the threaded portion 45. The diameter of this unthreaded portion 47 of the screw must be less than the inside diameter of the threaded region 41 in bushing 35 so that it can move very freely when assembled through the bushing 35.

The adjoining end of the half of sealing assembly 22(2), with the second shallow hole 31 in it also has a smaller diameter continuation of the hole and internal screw thread 51 at the deepest end of the hole that matches the external screw thread 45 on screw 34. The first part of this continued hole is a clearance hole that can comfortably accommodate the external threaded portion 45 of screw 34. The threaded portion 51 of this continued hole engages with the external screw thread 45 on screw 34. The length of the internal screw thread 51 should be slightly longer than the threaded portion 45 of screw 34.

The completed assembly of bushing 35, screw 34, and the sealing assembly halves 22(1) and 22(2), as shown in FIGS. 2 and 4, provides a rigid and precisely aligned fastening between the ends of the halves of sealing assembly 22. The disassembled halves of the sealing assembly 22 will also hold the screws 34 captive in one half of the sealing assembly 22. These captive screws 34 together with the chamfered ends on bushings 35 and the clearance holes in the other half of the sealing assembly 22 will allow the sealing assembly 22 to be correctly assembled around the shaft 16, even when access to the shaft 16 is restricted by other structures, such as rotor wheels 28 in this particular example, which impede manipulation of the ring halves and fasteners.

The operation of the self-aligning, non-contact sealing ring assembly 22 in a turbine 10 will be illustrated with reference to FIGS. 1–3. When the shaft 16 moves radially, the shaft 16 bumps into at least one of the broad bearing surfaces 54 of the sealing assembly 22. At the point of contact, the sealing assembly 22 on that side slides radially outward. Meanwhile, since the sealing assembly 22 surrounds the shaft 16, an adjustment on one side of the sealing assembly 22 pulls the diametrically opposite side of the sealing assembly 22 radially inward. As a result, the sealing assembly 22 is automatically realigned around the shaft 16 to maintain the smallest clearance or gap possible, thus minimizing any leakage. By way of example, in FIG. 3 if the shaft 16 moves radially upward and bumps the upper portion of the sealing assembly 22 to reduce the distance $d_1$, the diametrically opposing distance $d_2$ is increased the amount that the distance $d_1$ is decreased.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A sealing structure for a shaft, the shaft extending along and rotating about a central axis, a stationary member having an inner surface which is spaced from and surrounds the shaft, and a slot located in and extending around the inner surface of the member, the slot having an outer surface, an upstream surface, and a downstream surface, the structure comprising:

a sealing apparatus being disposed in the slot, the sealing apparatus having an inner surface, an outer surface, an upstream surface and a downstream surface;

a space between the outer surface of the sealing apparatus and the outer surface of the slot to accommodate radial movement of the sealing apparatus, the space extending all around the outer surface of the sealing apparatus; and one or more preloading devices, each of the preloading devices applying a force in a substantially axial direction between the upstream surface and the downstream surface of the slot to support the weight of the sealing apparatus.

2. The sealing structure according to claim 1 further comprising one or more labyrinth seal teeth which extend radially inward from the inner surface of the sealing apparatus each of the teeth being radially spaced from the shaft to form a non-contact seal.

3. The sealing structure according to claim 2 further comprising at least one broad bearing surface which extends radially inward from the inner surface of the sealing apparatus, the bearing surface being radially spaced from the shaft and having an axial width larger than any of the labyrinth seal teeth.

4. The sealing structure according to claim 1 further comprising a protrusion extending from the downstream surface of the sealing apparatus or the downstream surface of the slot.

5. The sealing structure according to claim 1 wherein each of the preloading device comprises a spring located in a hole in the sealing apparatus, the spring having a first and second end with the first end of the spring abutting the upstream surface of the slot through an opening in the sealing apparatus and the second end abutting the opposing surface of the sealing apparatus.

6. The sealing structure according to claim 1 wherein the force exerted by the preloading devices is about five times the weight of the sealing apparatus.

7. The sealing structure according to claim 1 wherein the sealing apparatus is split in half and is held together by at least one securing and aligning device.

8. The sealing structure according to claim 7 wherein the securing and aligning device comprises:

an opening extending between each end of each of the halves of the sealing apparatus, one end of each opening being threaded;

a bushing located in each opening to align the halves of the sealing apparatus; and a screw mountable in each opening, the screw extending through the bushing and having threads for engaging with the threads in the opening to secure the halves of the sealing apparatus together.

9. A turbine with a self-aligning sealing assembly, the turbine comprising:

a shaft which extends along and rotates about a central axis;

a housing which surrounds at least a portion of the shaft;

at least one pressure boundary penetrated by the shaft, the pressure boundary having an inner surface which is spaced from and surrounds the shaft;

a slot located in and extending around the circumference of the inner surface of the pressure boundary, the slot having an outer surface, an upstream surface, and a downstream surface;

a sealing apparatus being disposed in the slot, the sealing apparatus having an inner surface, an outer surface, an upstream surface and a downstream surface;

one or more labyrinth seal teeth which extend radially inward from the inner surface of the sealing apparatus, each of the teeth spaced from the shaft to form a plurality of non-contact seals;

space between the outer surface of the sealing apparatus and the outer surface of the slot to accommodate radial movement of the sealing apparatus, the space extending all around the outer surface of the sealing apparatus; and one or more preloading devices, each of the preloading devices applying a force in a substantially axial direction between the upstream surface and the downstream surface of the slot to support the weight of the sealing apparatus.

10. The turbine according to claim 9 further comprising at least one broad bearing surface which extends radially inward from the inner surface of the sealing apparatus, the broad bearing surface being radially spaced from the shaft and having an axial width sufficient to reduce abrasion when the rotating shaft contacts it.

11. The turbine according to claim 10 wherein the preloading device comprises a spring located in a hole in the sealing apparatus, the spring having a first and second end, with end of the spring abutting the upstream surface of the slot through an opening the first in the sealing apparatus and the second end abutting the opposing surface of the sealing apparatus.

12. The turbine according to claim 9 further comprising a protrusion extending from the downstream surface of the sealing apparatus or the downstream surface of the slot.

13. The turbine according to claim 9 wherein the force exerted by the preloading devices is about five times the weight of the sealing apparatus.

14. The turbine according to claim 10 wherein the sealing apparatus is split in half and is held together by at least one securing and aligning device.

15. The turbine according to claim 14 wherein the securing and aligning device comprises:

an opening extending between each end of each of the halves of the sealing apparatus, one end of each opening being threaded;

a bushing located in each opening to align the halves of the sealing apparatus; and a screw mountable in each opening, the screw extending through the bushing and having threads for engaging with the threads in the opening to secure the halves of the sealing apparatus together.

16. A turbine with a sealing structure, the turbine comprising:

a shaft which extends along and rotates about a central axis;

a housing which surrounds at least a portion of the shaft;

at least one pressure boundary penetrated by the shaft, the pressure boundary having an inner surface which surrounds the shaft;

a slot located in and extending around the circumference of the inner surface of the pressure boundary, the slot having an outer surface, an upstream surface, and a downstream surface;

a non-contact sealing member disposed in the slot, the non-contact sealing member having an inner surface, an outer surface, an upstream surface and a downstream surface;

one or more labyrinth seal teeth which extend radially inward from the inner surface of the non-contact sealing member each of the teeth spaced from the shaft to form a plurality of non-contact seals;

at least one broad bearing surface which extends radially inward from the inner surface of the sealing member, the broad bearing surface being radially spaced from the shaft and having an axial width larger than any of the labyrinth seal teeth;

a space between the outer surface of the non-contact sealing member and the outer surface of the slot to accommodate radial movement of the non-contact sealing member resulting from radial movement of the shaft, the space extending all around the outer surface of the sealing apparatus; and one or more preloading devices applying a force in a substantially axial direction between the upstream surface and the downstream surface of the slot to support the weight of the sealing member.

17. The turbine according to claim 16 wherein each of the preloading devices comprise a spring located in a hole in the sealing apparatus, the spring having a first and second end, with the first end of the spring abutting the upstream surface of the slot through an opening in the sealing apparatus and the second end abutting the opposing surface of the non-contact sealing member.

18. The turbine according to claim 17 wherein the force exerted by the preloading devices is about five times the weight of the non-contact sealing member.

19. The sealing structure as set forth in claim 1 wherein the upstream surface of the slot extends in a direction substantially along a plane which intersects with the central axis.

20. The sealing structure as set forth in claim 1 wherein the sealing apparatus comprises one piece which moves within the slot.

21. The turbine as set forth in claim 9 wherein the upstream surface of the slot extend in a direction substantially along a plane which intersects with the central axis.

22. The turbine as set forth in claim 9 wherein the sealing apparatus comprises one piece which moves within the slot.

23. The turbine as set forth in claim 16 wherein the upstream surface of the slot extends in a direction substantially along a plane which intersects with the central axis.

24. The turbine as set forth in claim 16 wherein the sealing apparatus comprises one piece which moves within the slot.

* * * * *